United States Patent [19]

Russell et al.

[11] 4,150,437
[45] Apr. 17, 1979

[54] ATTENDANCE RECORDING SYSTEM

[75] Inventors: Peter Russell, Little Gaddesden; Graham Webb, West Drayton, both of England

[73] Assignee: Automatic Revenue Controls (Europa) Ltd., Great Britain

[21] Appl. No.: 734,187

[22] Filed: Oct. 20, 1976

Related U.S. Application Data

[63] Continuation-in-part of Ser. No. 716,461, Aug. 23, 1976, abandoned, which is a continuation of Ser. No. 597,595, Jul. 21, 1975, abandoned.

[51] Int. Cl.$^2$ ............................................. G06F 1/00
[52] U.S. Cl. ................................................... 364/900
[58] Field of Search ...................... 346/52, 53, 54, 80, 346/82; 364/900 MS File

[56] References Cited

U.S. PATENT DOCUMENTS

| | | | |
|---|---|---|---|
| 3,641,321 | 2/1972 | Tonne | 346/80 X |
| 3,894,215 | 7/1975 | Lotter et al. | 346/82 X |

*Primary Examiner*—Raulfe B. Zache
*Attorney, Agent, or Firm*—Allegretti, Newitt, Witcoff & McAndrews

[57] ABSTRACT

Attendance recording equipment for recording information relating to the attendance of a group of personnel. The equipment includes personnel identification recognition means for receiving a person's identification means in order to produce a signal associated with that person, and a data memory capable of storing information individually associated with each of the personnel. The data also stores information relating to the time of presentation of each identification means to the recognition means. Output means are provided to retrieve information from the data memory at any time during the operation of the equipment. The data memory includes a store for a time worked total for each of the personnel, and this total is periodically and regularly incremented while the person is present. When the identification of a person is presented to the recognition means a display is illuminated to indicate the variation between the number of hours worked by that person and a predetermined number of hours. Accessing means are provided to alter the information in the data memory.

14 Claims, 5 Drawing Figures

ATTENDANCE RECORDING SYSTEM

This application is a continuation-in-part of our application Ser. No. 716,461, filed Aug. 23, 1976, now abandoned which is a Continuation of our application Ser. No. 597,595, filed July 21, 1975, now abandoned.

This invention relates to equipment for recording the attendance of personnel at their places of work. The invention particularly relates to equipment which is adapted to keep a record of the total number of hours worked by each of the personnel when a time of flexible working hours is in operation.

Known equipment used for this purpose may comprise meters or the like and time cards. Each of the personnel has a time card which he inserts into a "clocking-in" apparatus when he arrives at work. This apparatus may stamp the time of insertion on the card. The card is also inserted when the person leaves work, so that the hours worked by that person may be calculated by observing the times stamped on the card. The equipment may also be arranged to make a record containing information about the times of attendance of all the personnel with which it is associated. This record may be in the form of a punched tape, or a magnetic tape, on which the time of arrival of a person, together with information associated with that person so that he may be identified, is recorded.

At a later stage the tape may be removed from the equipment and processed through a computer so that the number of hours worked by each person may be assessed, so as to enable the determination of the wage of that person.

The operation of such equipment is rather inconvenient and time consuming. If information relating to the time worked by each person is readily available on the time cards associated with personnel, this information may be easily obtained by any person, which may be an undesirable situation. If the information is stored on tape or similar means, the tape can only be processed after its removal and insertion in a computer, so that there is a delay between the recording of the information and the processing of the information relating to the personnel. Furthermore, it is then necessary to not only have equipment for recording the time of attendance of the personnel, but also separate equipment for processing such information. Also in order for each person to work out the hours worked in a given period, he must perform mental calculations based on the times at which he has "clocked-in".

It is an object of the invention to obviate or reduce the effects of the aforementioned disadvantages. It is a further object of the invention to produce attendance recording equipment which is capable of automatically recording information relating to the times of attendance of personnel in such a manner that this information is readily available at any time. It is a further object of the invention to provide equipment which is capable at any time of displaying the information relating to the attendance of any or all of the personnel when the equipment is operated by a responsible supervisor.

It is a further object of the invention to provide equipment by means of which an employee can readily obtain information relating to his own attendance, which information preferably includes details of the amount of time he had worked in a given period, a comparison of this time with a standard, predetermined time, and an indication of whether or not he has failed to "clock-in" between correct predetermined times, the equipment being particularly adapted for use with a system of flexible working time.

Other objects of the invention will be made obvious in the following description.

Attendance recording equipment, in accordance with the invention, comprises a data memory which is operable to store information concerning the attendance of personnel, a clock, and personnel identification recognition means which are together operable, on presentation of the identification of one of the personnel to the recognition means, to supply information concerning the time of presentation and the identification of the person to the data memory, wherein the data memory is continually accessible throughout operation of the equipment so that at any time the information is available for alteration or determination.

Because the information is at all times readily available, unlike in known systems, the necessary calculations to obtain details about the length of time worked by a person, etc, may be performed by the equipment itself, obviating the necessity of transferring the information in the form of a punched tape or magnetic tape or the like to a separate computer. Furthermore, means may be provided to display information to each of the personnel on presentation of his identification to the recognition means, the information presented being associated with the amount of time he has worked over a given period, the variation of this time from a standard predetermined time, and/or whether or not he has committed an infringement i.e., whether or not he has "clocked" at a time which is not within required predetermined limits.

The calculations and operations of the equipment may be performed by a central processor or control which operates in a manner determined by a programme memory. Such controls and programme memories are well known in the art.

Means may also be provided to allow a qualified supervisor to operate the equipment in order to obtain the information relating to any or all of the personnel as well as to alter this information. Such alteration may be done, for example, when a person is on leave or sick.

For this purpose, the apparatus preferably includes a keyboard which can only be operated by suitably qualified people, who may be provided with a special key to enable them to operate the keyboard. This keyboard may be effective to cause a display to show any information relating to the personnel contained in the data memory as well as to alter such information.

Preferably the equipment is provided with a number of present/absent displays, each of which is associated with a particular employee and indicates whenever that employee is shown in the information in the data memory to be present.

The arrangement is also preferably such that the processor is operable, while the data memory shows that an individual is present, to periodically and regularly alter the information in the memory relating to the amount of time worked by that person so that this information is always up-to-date.

The equipment may be of modular form, each module being self-contained and including the required apparatus to perform the above mentioned functions for a particular group of personnel. A number of such modules may be interconnected by a central control which is operable to extract information from the various data memories as well as to up-date this information. In an alternative embodiment, the apparatus is centrally based and has a number of terminal units. The central unit may include the various memories and the control or processor and the terminal units may be provided with personnel recognition means and the displays which are operable to show the personnel information relating to the amount of time he was worked.

The equipment may also be provided with additional units for various purposes. For example, a remote unit may be provided to give a display of all the personnel who are present at any time. This would be useful for, for example, telephone operators. Also, an output unit may be provided to record data from the equipment in the form of punched tape or magnetic tape or the like, if it is desired. Also, units may be provided for the purpose of paging employees, the units being adapted to give a display associated with any particular employee, such as an employee number. Such a display may be used, for example, by a telephone operator, who would actuate the equipment so that the paging display is shown if a person is present.

The invention will now be further described by way of example, with reference to the accompanying drawings, in which.

Figure 1:
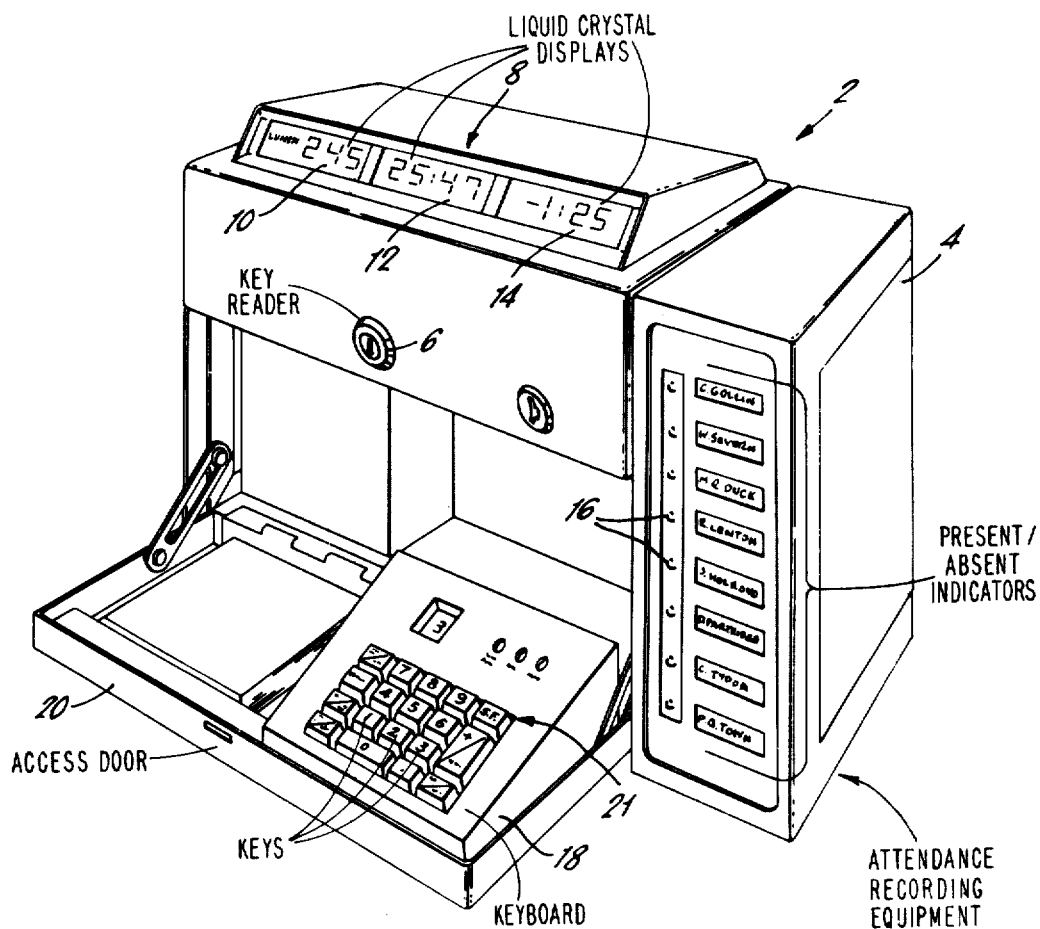
FIG. 1 is a perspective view of one embodiment of attendance recording equipment in accordance with the invention.

Referring to FIG. 1, attendance recording equipment 2 comprises a cabinet 4. The cabinet 4 has personnel identification recognition means in the form of a key reader 6. The personnel for which the equipment is arranged to be used each have a different key, and each person inserts his key when he starts and finishes work. The key reader 6 is arranged to receive each key and to produce an electrical output signal related to the particular key presented and hence the particular person associated with the key.

The cabinet is also provided with a display unit 8 comprising three individual liquid crystal displays 10, 12 and 14. The display 10 is adapted to show whether or not an employee has committed in infringement. This is achieved by having the display illuminate one of the three words "lunch", "core", or "night", in accordance with which type of infringement has occurred, which will be more fully described later. The display 10 is also operable to show a number associated with a person when the display is showing information relating to that person. The display 12 normally shows the time of day, and is operable on insertion of a key into key reader 6 to change to show the number of hours worked in a given period by the person whose key is inserted, the display 14 shows, when a key is inserted, the variation between the number of hours worked by the person inserting the key and a predetermined standard number of hours which may be said to be worked by an average employee in the same period, as will be described below. These variations may be a positive or negative quantity.

The cabinet also includes a number of present/absent indicators 16. Each indicator is a light emitting diode and is associated with a particular employee. Each indicator is illuminated when and only when the employee with which it is associated is present. In the embodiment shown in FIG. 1, the equipment is adapted to be used with eight employees, but obviously it may be adapted to use with more or less employees.

The cabinet also includes a keyboard 18. This keyboard 18 is normally housed in the interior of the cabinet and access may be gained by opening the door 20 which is hinged to the cabinet. The door 20 is normally locked closed and the arrangement may be such that only suitably qualified supervisors or operators are provided with keys which are capable of opening the door 20, so that only these people may operate the keyboard 18. The keyboard 18 is provided with a number of keys 21, and the function of these keys will be described more fully hereinafter.

Figure 2:
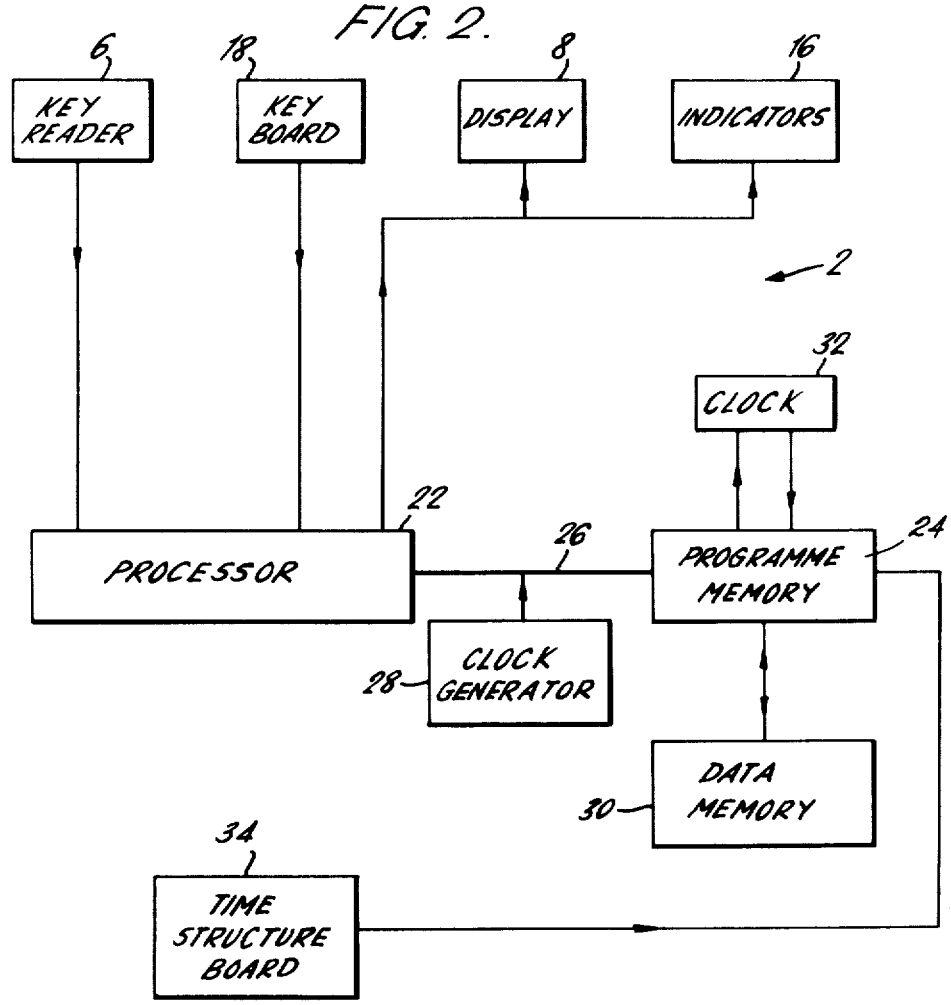
FIG. 2 is a schematic block diagram of the electronic components of the equipment of FIG. 1.
Figure 3:
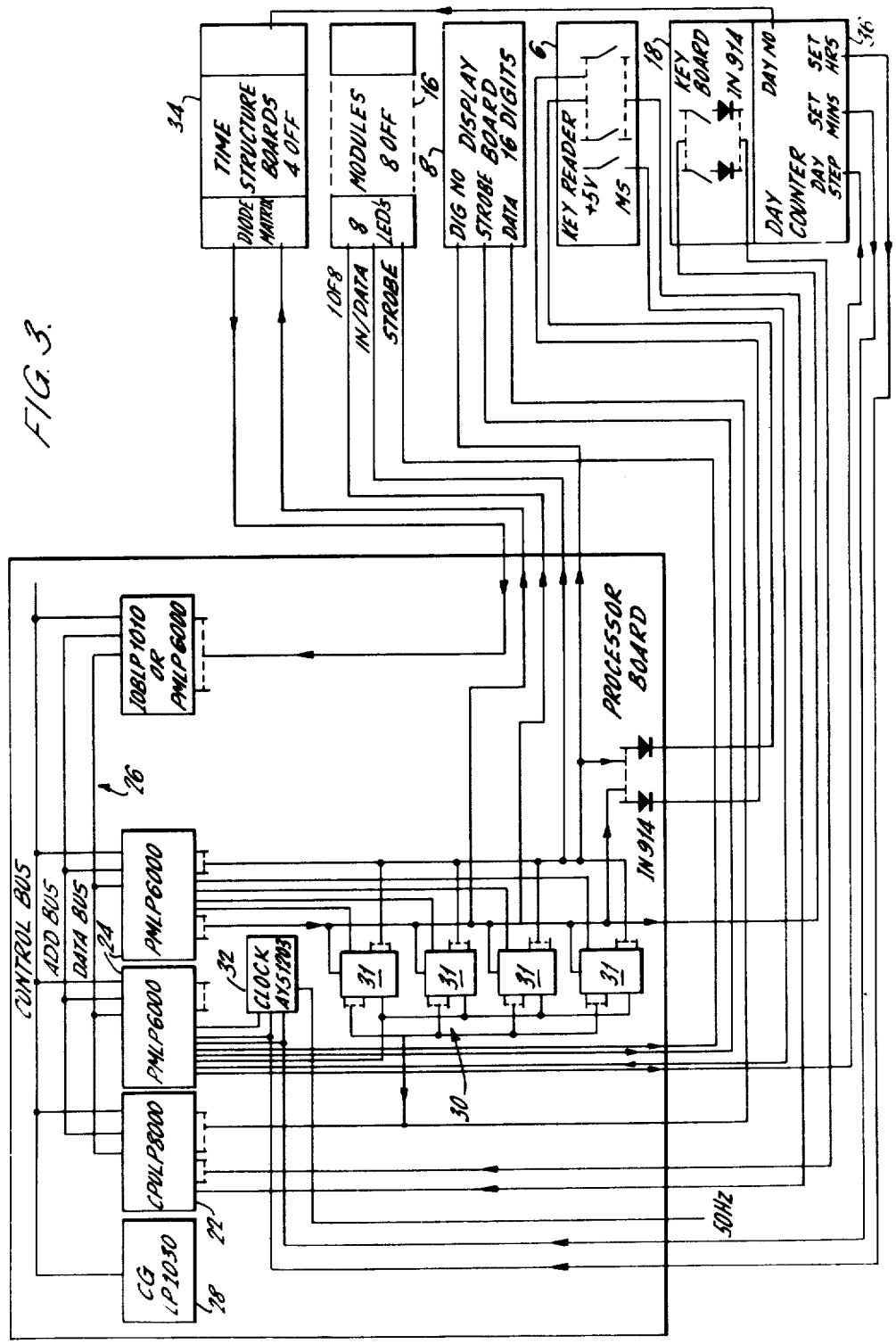
FIG. 3 is a schematic wiring diagram of the components of FIG. 2.

Referring now to FIGS. 2 and 3, the attendance recording equipment 2 includes a processor or control 22, and a programme memory 24, which are inter-linked by a bus 26. The processor 22 is formed by a large scale integrated circuit and includes an accumulator, and forty-eight internal registers, each of which has eight bits. The internal registers are used as a temporary store in the system.

The programme memory is a read only memory (ROM), and is used to store the programme which controls the manner in which the equipment works. The processor 22 and the programme memory 24 are in themselves known in the art. An example of a system suitable for use as a processor and programme memory is the "Series 8000 Microprocessor" which is available from General Instrument Corporation Microelectronics, of 600 West John St., Hicksville, New York, 11802.

In this case, the processor comprises the part number LP8000 and the programme memory comprises parts LP6000. In order to make the processor and programme memory operational a pulse or clock generator 28 is provided. This clock generator is also available within the "Series 8000 Microprocessor" and comprises part number LP1030.

The key reader 6, keyboard 18, display unit 8, and indicators 16 are all connected to the processor 22. It should be noted that the interconnections shown in FIGS. 2 and 3 are of a schematic nature. The system also includes a data memory 30. The data memory comprises four integrated circuits 31, (FIG. 3), each of which has a 1K bit memory, organised as 256 words having four bits each. Such integrated circuits are well known and may be of the type RA3-4256B, which are available from General Instruments Corporation Microelectronics, of 600 West John St., Hicksville, New York, 11802.

The data memory 30, which is connected to the programme memory 34, is adapted to store the following information about each employee.

(a) The number of hours worked by the employee since a predetermined starting time, (b) the variation between the hours worked by the employee and a predetermined standard number of hours, (c) whether or not the employee has committed (i) a core infringement, (ii) a lunch infringement, or (iii) a night infringement, as will be more fully described later, and (d) whether or not the employee is present.

The data memory can also be used to store other information about the employee.

The system also includes a clock 32, which is separate from the clock generator 28, the latter being used only to supply the required output to operate the processor 22 and the programme memory 24. The clock 32 is connected to the programme memory 24 and supplies an output which is related to the time of day.

The system further includes one or more time structure boards 34 connected to the programme memory 24. The purpose of the time structure boards 34 will be described below.

Figure 4:
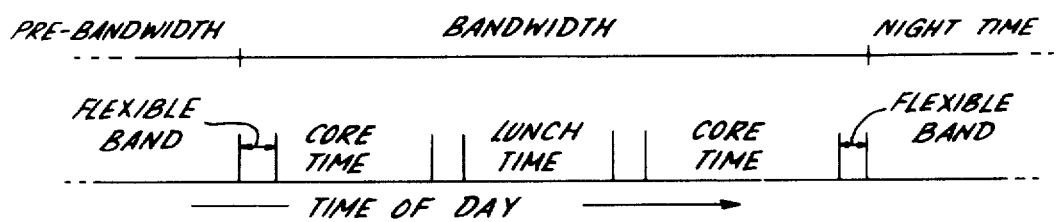
FIG. 4 is a diagram of a time structure relating to permitted times of work for employees and in accordance with which the equipment of FIG. 1 is programmed.

Before describing in detail the function and operation of the system, the time structure within which the equipment is programmed to operate will be described. FIG. 4 shows a diagram which is a time scale of one working day. The time of day is divided into three general periods, the pre-bandwidth period, the bandwidth period, and the night time period.

The pre-bandwidth is a time period during which an employee may key into the system, i.e., start work, but in which he does not accumulate any hours worked, and hence is not paid for this time.

The bandwidth period is divided into a number of sections, and an employee may start work or finish work at any time during this period, and increment his total of hours worked, except for certain restrictions, which will be described later.

The night time period occurs after the bandwidth period, and each employee is expected to key out before the beginning of this night time period. If he does not, his record in the data memory is altered to show that he has committed a night infringement.

The bandwidth comprises the following periods. First of all there is a flexible band in which employees may key in and start to accumulate the total of hours worked without restriction. Then there is a core time during which an employee is required to be present. Accordingly if an employee starts or finishes work during this core period and accordingly inserts his key in key reader 6, his record in the data memory will be altered to show that he has committed a core infringement. Next there is a lunch period over which an employee is required to take a break. When an employee keys out at lunch time he will not be allowed to key in before he has taken the minimum specified lunch break. Failure to take the required amount of lunch break will result in the employee's record being altered to show that he has committed an infringement. Lunch time may be proceeded and/or followed by a flexible band, to allow for lunch breaks to be taken at different times.

After the lunch time period there is another core time period, and as before an employee is required to be present during the whole of this core time period. Any key operation will cause a core infringement to be stored in an employee's record in the data memory. This second core time period is followed by another flexible band before the night time period and an employee is allowed to leave work at any time during this flexible band. The insertion of the employee's key when he leaves work will cause the record of the number of hours worked by that employee to no longer be incremented in the employee's store in the memory.

The operation of the apparatus will now be described with reference to FIGS. 1, 2 and 3. When the employee starts work, he inserts his key into key reader 6. This sends a signal to the processor 22, which causes the programme memory 24 to alter the employees record in the data memory 30 to show that the employee is present. If the employee inserts his key at a time which is indicated by the clock to be during the first flexible band period, the processor will start to regularly increment the store in the memory which contains the total of the time worked from a predetermined start time by that employee. If the employee starts work in the pre-bandwidth period such accumulation will not start until the beginning of the flexible band period. If the employee keys in during the core period his record in the memory will be altered to show that he has committed a core infringement.

On insertion of the key in the key reader 6 the display unit 8 is caused by the processor 22 to show whether or not he has committed an infringement, and also the number associated with the employee. This information is shown on display 10 of the display unit 8. The display 12 of the display unit 8 changes from showing the time of day as indicated by the clock 32 to show the total number of hours worked by that employee from a given start time, as recorded in his store in the data memory 30. The display 14 of the display unit 8 shows the employee the variation between his time and a standard time which would be an employee who works for a predetermined number of hours each day. Accordingly, when the employee keys in he immediately sees information relating to his previous attendance and specifically he is able to determine how his time worked total compares with a standard total so that he is therefore able to easily work out how much extra time, if any, he should work to increase his time worked total.

When the employee inserts his key to start work, the indicator 16 associated with that employee is illuminated.

At some later stage the employee will then insert his key before leaving work for lunch. If he does this at a time which is not permissible such as core times the appropriate record will be stored to show that he has committed an infringement. When the key is inserted for the employee to leave work, his time worked total is no longer incremented by the processor 22. When the employee keys out to leave work the various displays of the display unit 8 are again caused to show the employee whether or not he has committed an infringement, the number of hours worked by him, his key number, and the variation between the number of hours worked and the standard time. The employee may key in later, after having taken lunch, in which case the procedure is as above, with the displays again being activated and the processor again starting to regularly increment his time worked total. When the employee keys out after having finished work he is again shown the appropriate information on the display unit 8, and his time worked total is no longer incremented.

The arrangement may be such that a record is made in the employee's store in the data memory 30 if that employee was present during the moring core time, and, if this is not the case, he may be allowed to key in during lunch time without incurring a lunch infringement. The variation between the number of hours worked by an employee and a standard time may be calculated so that it is accurate whenever the employee keys in or out during a flexible band period. Having keyed into the system, the variation is calculated and displayed to the employee, and this variation is "frozen" until core time starts. Thus if the memory is interrogated at any time during the work period before core time the record will show this frozen variation as calculated at the first entry of the employee's key. If the record is interrogated during the following core time or after he keys in for the first time during core time, the record will show a variation calculated against the standard time measured at the end of the work period. Thus, an employee who leaves during core time will see the same variation when he returns during the next flexible period.

The parameters of the time structure shown in FIG. 4 will naturally be different for different situations, e.g., different places of work. Also, it may be desired to have different time structures for different days of the week, e.g., a structure which enables people to leave early on Fridays. The parameters of the time structure are determined by the time structure board 34 shown in FIGS. 2 and 3. The board comprises a diode matrix, and the positions in which the diodes are inserted on the board determine the beginnings and ends of the various time periods. The positions of the diodes also determine the morning and afternoon "target hours". The "target hours" are the number of hours worked by a model employee during either a morning or afternoon. The standard amount of time, with which the amount of time worked by an employee is compared to obtain his variation, is incremented twice daily by these target hours. If desired, a number of boards may be used for different time structures, each board being associated with a particular day of days of the week. The particular board used each day is determined by the day counter 36 (FIG. 3) which is linked to the clock 32.

The above description outlines the operation of the apparatus as far as the employees are concerned. However, it may be that a supervisor or operator wishes to determine the status, as shown in the data memory 30, of any or all the employees. Also he may wish to alter the information in the memory 30. In order to achieve this the keyboard 18 is provided. Operation of this is as follows.

When a supervisor wishes to interrogate or alter the data memory 30 he unlocks the door 20 to gain access to the keyboard 18. The keyboard 18 is linked to the processor 22 and is operable to cause the processor to extract or alter information in the memory 30. The keys of the keyboard are operable to cause the processor 22 to perform the following functions:

(a) To alter the record of an individual employee. This is achieved by using the keys 22 to instruct the processor to perform the required operation e.g., to alter the record of the number of hours worked by the employee, or to cancel an infringement made by the employee,
(b) to alter the records of all the employees at the same time,
(c) to scan the records of all the employees. This causes the equipment to display, on the display 12, the status of hours worked of each employee in turn, in order of key number,
(d) to display the standard time with which the employees records are compared; this standard time can then be zeroed or up-dated,
(e) to display the time state, i.e., night, core, or lunch period, or none of these,
(f) to display the highest key number in use with the equipment,
(g) to display the morning target hours,
(h) to display the afternoon target hours,
(i) to check that the present/absent indicators 16 are working.

The keyboard is of a type known in the art.

The equipment of FIGS. 1 to 3 forms a self-contained locally-based system, and is relatively easy to service and cheap as far as installation costs are concerned.

Figure 5:
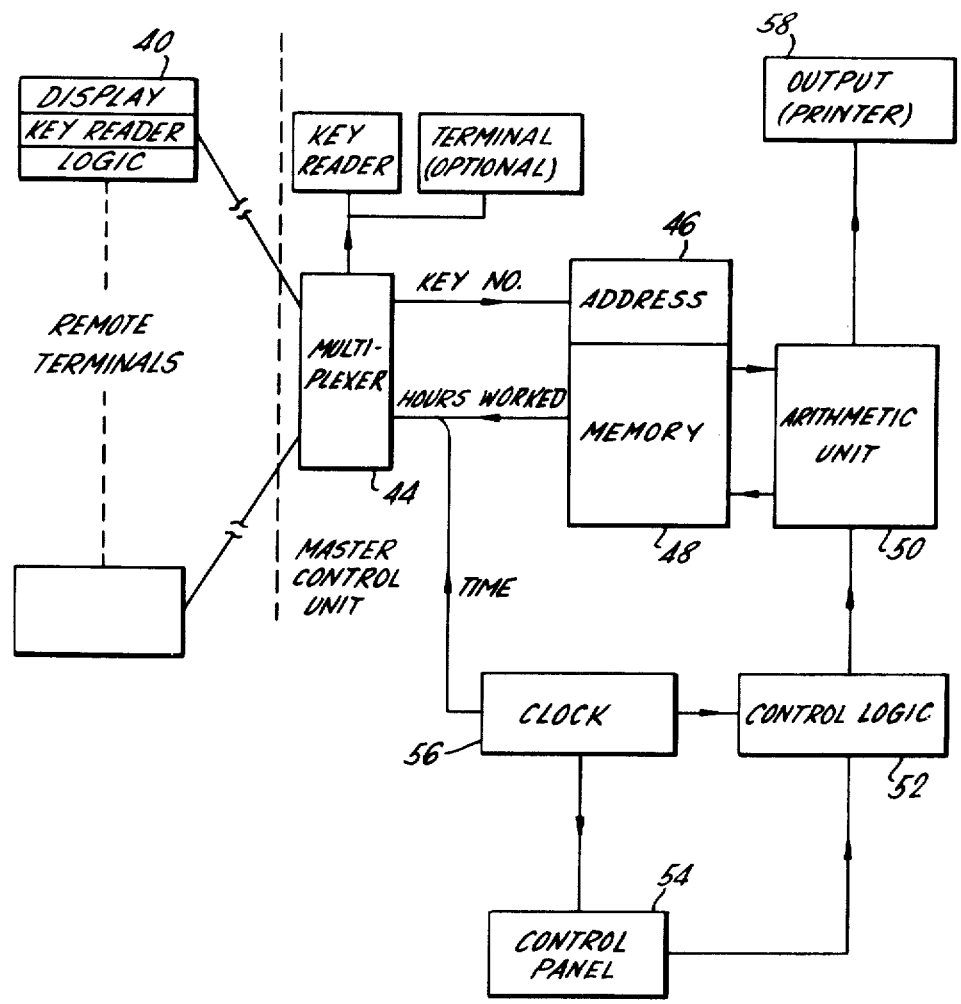
FIG. 5 is a block diagram of an alternative embodiment of attendance recording equipment in accordance with the invention.

Referring to FIG. 5 the embodiment of the attendance recording equipment operates in a generally similar manner to that of FIGS. 1 and 2, but is a centrally based system having a plurality of terminals where employees may key into the system. The terminals 40 each include a time display which normally shows the time of day, a key reader and a logic circuit arranged so that when an employee identification key is inserted, the operations of starting or stopping the incrementing of the employees time record, and displaying his time worked total, are set in motion.

All the terminals 40 are connected via a multiplexer 44 in the master unit, which enables contact to be maintained with all the terminals at all times so that the time of day can always be displayed and so that a number of employees can use the system at once. When a key is inserted in one of the terminals 40, the number of the key is read and transmitted via the multiplexer to an addressing device 46 of a memory 48 which contains one memory location, comprising a binary number register, for each employee in which his time worked is recorded and also an indication of whether that employee is "in" or "out". The insertion of the key causes this indication to change is state and if it changes to the "in" state, an arithmetic unit 50 begins to increment the addressed memory location.

At the same time the display on the terminal is changed to show the employee his record of time worked which is translated from its binary number state in the memory by the arithmetic unit 50. The system also includes a control logic unit 52 and control panel 54 which includes programming means to set the expected time worked into a "standard time" memory location and enables adjustments by means of which the time stored in any of the memory locations can be altered, to take account of holidays and the like. A crystal clock 50 provides a time standard for the whole apparatus. A printer 58 provides details of all the recorded times in the memory on demand, via the arithmetic unit 50 so that the times are printed out in hours and minutes.

We claim:

1. Attendance recording equipment for recording information relating to the attendance of a group of personnel, each member of the group having identification means, the equipment comprising, key reader means arranged to produce a signal associated with a particular person on presentation of said person's identification means to said key reader means, a clock having an output indicative of the time of day, a data memory capable of storing information individually associated with each of the personnel, said information relating to the attendance of said personnel, processor and programme memory means connecting the key reader means and the clock to the data memory, so that the memory is operable to store information related to the time of presentation of an identification means to the key reader means, and output display means, connected to said processor and programme memory means, said programme memory means being operable to retrieve information from the data memory and to direct it to said output display means at any time during the operation of the equipment.

2. The equipment of claim 1 wherein said output display means comprises an illuminated visual display.

3. The equipment of claim 1 further comprising accessing means and means connecting said accessing means to said data memory, said accessing means being operable to retrieve selected information from the data memory.

4. The equipment of claim 3 wherein said accessing means comprise a keyboard operable to alter information in the data memory.

5. The equipment of claim 1 wherein the data memory is arranged to store information relating to the individual total of time worked by each employee from a given time, and is further arranged to record whether or not each person is present, the processor being operable to regularly increment the record of the time worked by a person whenever the data memory shows that that person is present.

6. The equipment of claim 5 wherein the processor is adapted to calculate the variation between the time worked by an employee and the predetermined standard time, and the data memory is adapted to store the result of this calculation for each person.

7. Attendance recording equipment for recording information relating to the attendance of a group of personnel, each member of the group having identification means, the equipment comprising,
key reader means arranged to produce a signal associated with a particular person on presentation of said person's identification means to said key reader means,
a clock having an output indiciative of the time of day,
a data memory capable of storing information individually associated with each of the personnel, said information relating to the attendance of said personnel, and
processor and programme memory means connecting the key reader means and the clock to the data memory, so that the memory is operable to store information related to the time of presentation of an identification means to the key reader means,
wherein the data memory is arranged to keep a record of the amount of time worked by a person from a predetermined start time, and wherein said processor is operable to periodically and regularly increment this record when said person is present.

8. The equipment of claim 7 further including a display, and means connecting said display with said data memory, the arrangement being such that the signal produced by the presentation of the identification means to the key reader means cause information relating to the person associated with said identification means to be displayed, said display information including the amount of time worked by the person since the predetermined start time and the variation between this amount and a predetermined amount.

9. The equipment of claim 7 further including a number of indicators, connected to said processor, each indicator being associated with one member of the group of personnel and being operable to indicate the presence of that member, the indicator being caused to indicate said presence when the identification means is presented to the key reader means.

10. Attendance recording equipment for recording information relating to the attendance of a group of personnel, each member of the group having identification means, the equipment comprising,
key reader means arranged to produce a signal associated with a particular person on presentation of said person's identification means to said key reader means,
a clock having an output indicative of the time of day,
a data memory capable of storing information individually associated with each of the personnel, said information relating to the attendance of said personnel,
processor and programme memory means connecting the key reader means and the clock to the data memory, so that the memory is operable to store information related to the time of presentation of an identification to the key reader means,
and accessing means, connected by said processor and programme memory means to said data memory, said accessing means being operable by an operator to alter the information in the data memory.

11. The equipment of claim 10 wherein said accessing means comprises a keyboard further operable to cause information in the data memory to be directed to an output.

12. The equipment of claim 10 wherein said accessing means is arranged to be selectively operable either to alter information relating to a single person or to alter information relating to all the personnel.

13. The equipment of claim 1 further including time structure means connected to said programme memory means whereby said programme memory means is arranged to be programmed so that each person may only be permitted to present his identification means to the key reader means within predetermined time periods, and if the identification means are presented at any other time a record is made in the data store that a person has committed an infringement.

14. The equipment of claim 13 wherein the output display means comprises a display which is operable on presentation of the identification means to the key reader means to show whether or not an infringement has been committed.

* * * * *